June 2, 1964 F. H. RAYMOND 3,135,447

TAPE READER CONTROL DEVICE

Filed June 6, 1961

Inventor:
Francois H. Raymond
By Kemon, Palmer,
Stewart & Estabrook
Attorneys

United States Patent Office
3,135,447
Patented June 2, 1964

3,135,447
TAPE READER CONTROL DEVICE

Francois Henri Raymond, Saint-Germain-en-Laye, Seine et Oise, France, assignor to Societe d'Electronique et d'Automatisme, Courbevoie, France
Filed June 6, 1961, Ser. No. 115,189
Claims priority, application France June 16, 1960
6 Claims. (Cl. 226—42)

Figures 1, 2, 3, 4:
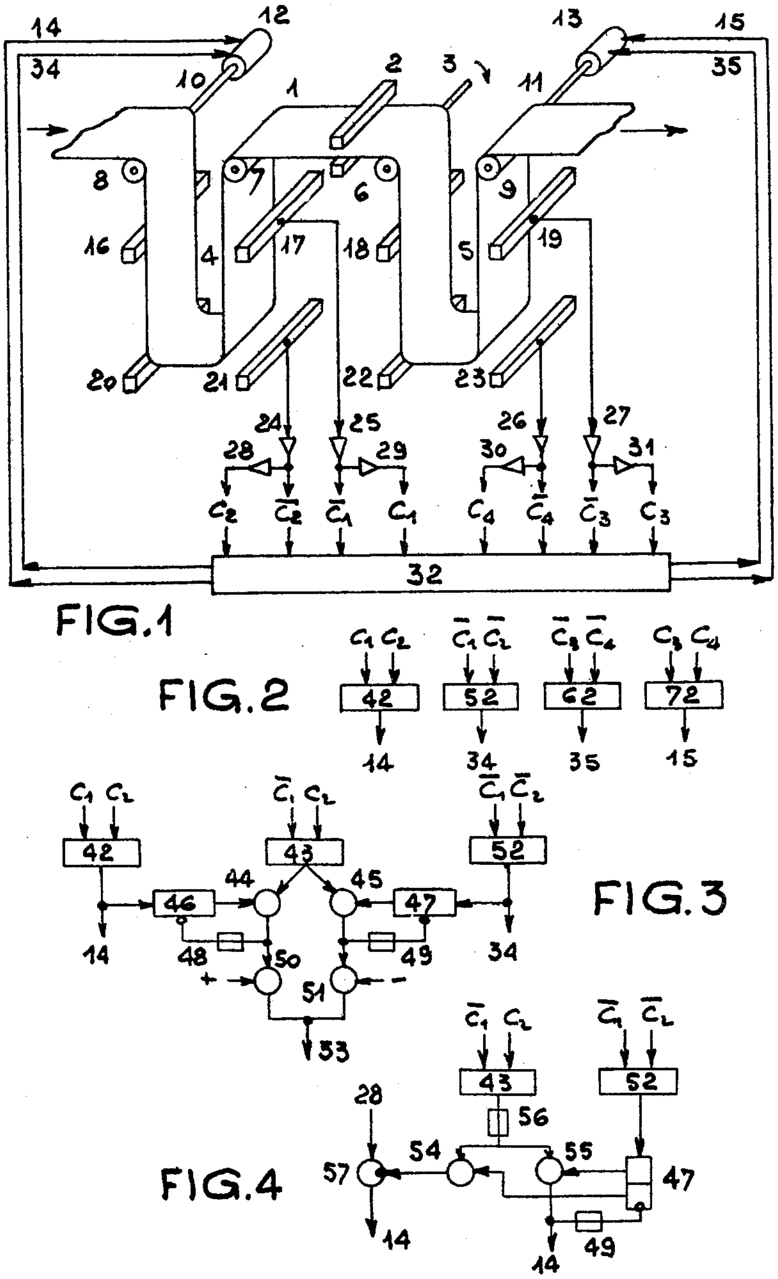

The present invention concerns improvements in or relating to the control of operation of tape readers and the like, wherein an elongated carrier such as a punched tape, a magnetically recorded tape or an optically recorded tape is driven over a pick-up arrangement for reading out information therefrom. The invention is mainly concerned with the control for stabilizing the drive of the tape at the said pick-up place, from an automatic control of the lengths of the two bends which are usually provided in the path of such a tape on either sides of said pick-up place, one bend upstream, the other bend downstream with respect to the direction of drive of the tape. As known, an efficient stability of such bends, or loops, is desirable for a stable read-out of the information on the tape, especially when, as the invention is concerned, such information is a binary-coded one.

The usual bends in the tape are conventionally made by passing the tape over sets of rollers which may either be free to rotate under the action of the friction from the tape or may be driven together with a further member which actually drives the tape and is located near the pick-up arrangement proper. There exists at least one such roller at the input of the upstream bend and at the output of the downstream bend on the path of the tape.

According to the invention, each one of such bend guiding rollers is linked to a separate driving member which is electrically activable for imparting to said roller, when activated, a higher speed than that imparted to the tape at the pick-up arrangement place, at least one sensing means of length of the bend is associated to each bend of the tape, each sensing means delivering at least one two-level signal of electric nature representative of the length condition of said bend, and a logical signal processing arrangement receives said signals from said sensing means and delivers control signals to said activable driving members suitable for stabilizing the drive of the tape at the read-out place thereof.

Preferably the sensing means are of the photoelectric type and preferably also, one pair of sensing means is associated with each bend of the tape for determining a maximum and a minimum length value thereof between which must be maintained the actual length of the bends. Preferably further, the electric signals issuing from such sensing means are handled as numerical digital codes by the logical processing circuit from which are formed the control signals to the said activable members of the rollers.

These and further features will be detailed with reference to the accompanying drawings, wherein:

FIG. 1 shows the diagram of a preferred embodiment of a tape reader control device according to the invention; and, FIGS. 2, 3 and 4 show a few possible arrangements for the logical processing circuit in FIG. 1 according to various features of the required control.

From such examples of logical processing circuits, one may easily derive any other circuit which may be used, as it will be detailed in the specification.

Referring to FIG. 1, the tape 1 is driven under a read-out pick-up device 2 and the drive for instance comprises a guiding roller 6 which is driven at a constant speed by its shaft 3, when the tape reader is operating. Another roller 7, free to rotate for instance, further guides the tape near the pick-up device 2 but on the other side with respect to 6. An upstream bend is made at 4, defined for instance by an input roller 8 and said roller 7. A downstream bend 5 is provided between the roller 6 and an output roller 9.

The shaft 10 of the roller 8 is connected to a driving member 12, which is intermittently activated. Similarly the shaft 11 of the roller 9 is connected to an intermittently activated driving member 13. When one of said members is activated, the tape will be driven by the corresponding member. Two cases are to be considered: in the first case, each member can only drive the roller, consequently the tape, in a single direction: for lengthening the bend 4 by rotation of the roller 8, for shortening the bend 5 by rotation of the roller 9. In the second case, each member can drive its roller in both directions of rotation so that each bend may be either shortened or lengthened under the drive of said member and the direction of activation thereof. In the first case, the members 12 and 13 are solely controlled from the connections 14 and 15 from the logical processing circuit 32. Each member 12 and 13 may comprise an electric motor and a clutch or an electric motor and an electrically controlled stop-start switch. When the connection 14 is activated by the circuit 32, a higher level signal then existing on said connection, the motor in 12 will be actuated, said motor being stopped when this connection 14 receives a lower level voltage from 32. Similarly, the motor 13 will be only actuated when the connection 15 receives a higher level voltage from 32, and at rest when said connection receives a lower level voltage from 32. In the second case, the motor or clutches or switches comprise means for a two-direction control, for instance the motors are of a kind which may rotate both ways and change-over switches are controlled from 32 to revert the supplies. Two additional connections from 32 are provided, 34 and 35 respectively. Connections 14 and 34 cannot be simultaneously activated, and neither can connections 15 and 35. When connection 14 is activated, the motor 12 will rotate in one direction, and the motor will rotate in the other direction when connection 34 is activated. Similarly, the motor 13 will rotate in one direction when 15 is activated and in the reverse direction when 35 is activated.

To the upstream bend 4 is associated two photoelectric sensing means, one comprising the light box 16 and the photocell 17 and is arranged slightly above the level of the minimum required length of the bend 4, the other comprises the light box 20 and the photocell 21 and is arranged slightly beneath the level of the maximum required length of the bend 4. To the downstream bend 5 is similarly associated two photoelectric sensing means, the first comprising the light box 18 and the photocell 19, at an upper level corresponding to the required minimum length of the bend 5, the second comprising the light box 22 and the photocell 23, at a lower level corresponding to the required maximum length of the bend 5. The output of 17 is connected to the input of an amplifier 25 followed by a further amplifier 29. Each amplifier is of a polarity-reversal type. The output voltage from 29 will be of a higher level when the photocell 17 is illuminated, of a lower level in the other alternative. The output signal from 17 is denoted $C_1$. The output voltage of 25 will be of a higher level when the cell 17 is not illuminated and of a lower level when the photocell is illuminated. The output signal from 25 is denoted $\overline{C}_1$ as being always complementary of the signal $C_1$. Similarly, the photocell 21 is connected to the amplifiers 24 and 28 for giving the two signals $\overline{C}_2$ and $C_2$; the photocell 19 is connected to the amplifiers 27 and 31 for obtaining the two signals $\overline{C}_3$ and $C_3$; and the photocell 23 is connected to the amplifiers 26 and 30 for obtaining the two signals $\overline{C}_4$ and $C_4$. All said signals are applied to inputs of the circuit 32 which delivers control signals for 12 and 13 obtained from combinations of a logical kind of such signals C.

Several practical cases will now be considered for better defining the structure of the circuit 32.

The first one is that wherein the roller 6 is actually driven at a constant speed and the members 12 and 13 are each of a change-over control type for rotating the rollers 8 and 9 in either direction. Under such conditions, when the photocells 17 and 21 are illuminated, the member 12 must be activated for driving the roller 8 in the clockwise direction (on the drawing) and consequently lengthening the bend 4 which was too short. When on the other hand, the photocells are not illuminated, the length of the bend must be shortened and the member 12 must be activated for rotating the roller 8 in the reverse direction. Similarly, when the photocells 19 and 23 are illuminated, the member 13 must be activated for rotating the roller 9 counterclockwise and, when said photocells are not illuminated, the member 13 must drive the roller 9 in a clockwise direction. Under such conditions, the control circuit 32 is of the type shown in FIG. 2. It comprises four AND-circuits, 42, 52, 62 and 72. Circuit 42 receives $C_1$ and $C_2$ as input signals and the output of 42 is connected to 14 so that 8 will rotate in the clockwise direction when both the $C_1$ and the $C_2$ signals are at their higher voltage levels, photocells 17 and 21 being illuminated. Circuit 52 receives $\overline{C}_1$ and $\overline{C}_2$ as input signals and the output thereof is connected to 34 in order to rotate the roller 8 in the counterclockwise direction when both cells 17 and 21 are not illuminated. When cell 17 is not illuminated and cell 21 illuminated, no movement is imparted to 12. Circuit 62 receives the signals $\overline{C}_3$ and $\overline{C}_4$ as input signals and its output is connected to 35 for rotating the roller 9 in the clockwise direction when both photocells 19 and 23 are not illuminated, and consequently the length of the bend 5 is too important. Circuit 72 receives the input signals $C_3$ and $C_4$ and its output is connected to 15 for rotating the roller 9 in the counterclockwise direction when both cells 19 and 23 are illuminated and the bend 5 too short.

When the members 12 and 13 can only rotate in one direction each, for driving the roller 8 in the clockwise direction and the roller 9 in the counterclockwise direction, the circuits 52 and 62 are no longer required. Actually, the sensing means delivering the signals $C_1$ and $C_3$ may further be omitted so that the control circuit may be reduced to a connection of the output of 28 to the control connection 14 and a connection of the output of 30 to the control connection 15. Such a simple scheme is too obvious to be illustrated, but it may be noted that it is not desirable for the efficiency of the operation as lacking of sufficient control ability.

Another consideration may be the mechanical resistance of the driven tape proper. When the rigidity is that of a kinematographic film or the like, the upstream bend will push the tape under the read-out arrangement and the downstream bend will oppose a certain resistance to the drive. Advantage may be taken from such a condition, when available, for speeding up the controlled variations of lengths of the bends. For instance, when the downstream bend is too short, signals $C_3$ and $C_4$ at their higher levels, the control may be so provided that the upstream bend be forced to develop even when simultaneously said upstream bend was passed the level of the sensing means 16—17 and theoretically is not incorrect, signals $\overline{C}_1$ and $C_2$ at their higher levels. Conversely, when both signals are at their higher levels for the upstream bend, i.e. $C_1$ and $C_2$, and simultaneously the downstream bend is at its normal condition with $C_4$ and $\overline{C}_3$ at their higher levels, the control may be so made that the downstream bend increases its length so that a certain resistance of the drive of the tape is obtained and consequently a speeding up of the lengthening of the upstream bend. For practicing this arrangement, it suffices to add to the logical circuit 32 two AND-circuits, one of which receives the signals $\overline{C}_1$, $C_2$, $C_3$, $C_4$ and has its output connected to 14 together with the output of 42, the other of which receives the signals $C_1$, $C_2$, $\overline{C}_3$, $C_4$ and has its output connected to 15 together with the output of 72. It is to be noted that the presence of such two additional circuits in schemes when the members 12 and 13 can rotate in a single direction each improves the operation so that they may be used with the simplified scheme wherein 42 and 72 are replaced by straight connections from the amplifier outputs to the leads 14 and 15.

It may be further considered that, when the tape is of sufficient rigidity, as assumed above, the separate drive by a motor driving the roller 6 may be omitted and the drive ensured by the rollers 8 and 9 and the driving members 12 and 13 thereof. The member 12 may then push the tape and the member 13 pulls it, so that said members do not have to be of reversible operation. The member 12 must drive the roller 8 in the clockwise direction and the member 13 must drive the roller 9 also in the clockwise direction, when said members are activated. Of course, one of said members must be operative at any time. Member 12 will be driven by the signal $C_2$ at the higher level thereof, and additionally and preferably by an AND signal resulting from the combination of the signals $\overline{C}_2$ and $C_3$ (the upstream bend will be thus lengthened each time the downstream bend will be too short). That part of the control will consequently be ensured by the simultaneous presence on the connection 14 of the signal issuing from 28 and the signal issuing from an AND-circuit receiving the outputs of 24 and 27. The member 13 will be controlled by the connection 35 from the output of 31, signal $\overline{C}_3$ with the addition thereto of the AND-signal issuing from an AND-circuit receiving at its inputs the signals $C_1$ and $\overline{C}_3$ (or $\overline{C}_4$, as desired) so that if the upstream bend is too short, the lengthening of the downstream bend is imposed for opposing to the drive of the tape and consequently favouring the lengthening of the upstream bend.

The member 13 may be preserved rotating in either direction and in such a case, on the connection 15 will be applied the signal $C_3$ which will favour the stabilisation of the downstream bend.

In the preceding arrangements, inertia of the device has been neglected. When for instance the roller 8 is driven clockwise for lengthening the bend 4, under the control of AND-signal $C_1.C_2$ from 42 in FIG. 2, when said signal disappears, the inertia of the rotating part might produce a substantial and unwanted lengthening of the bend, the more said bend is flexible per se (punched or magnetic tape), the level of the sensing means 20—21 might be far outpassed and consequently the AND-signal $\overline{C}_1.\overline{C}_2$ would be instantaneously heightened and effect a reverse control of the member. Conversely the action of the signal $\overline{C}_1.\overline{C}_2$ might produce an exaggerated shortening of the bend due also to the inertia of the rotating part. Consequently, there is a risk of oscillation of the bend, which though progressively damped, is undesirable per se. Means must then be provided for avoiding such an oscillating effect in the operation of the device.

It must be noted that a motor of the kind concerned in the members 12 and 13 conventionally incorporates a means for braking, either an electromechanical brake, which acts independently of the direction of rotation, or an electromagnetic brake, comprising an additional winding of the motor of a reverse action to that of the energising winding of the motor, which acts according to the direction of rotation of the motor since said additional winding must be supplied for the brake effect with an electrical current of a direction opposite to that of the supply of the main energising winding of the motor.

For an electromechanical brake, an additional AND-circuit may be provided which receives the signals $\overline{C}_1$ and $C_2$ and consequently issues a signal $\overline{C}_1.C_2$ when both signals are at their higher levels; another additional AND-circuit may be similarly provided operating on the input signals $\overline{C}_3$ and $C_4$ and delivering a signal $\overline{C}_3.C_4$. Said AND-signals will be respectively applied to the electromechanical brakes in the members 12 and 13. With such an arrangement, as soon as the bend 4 is of normal length, photocell 17 not illuminated and photocell 21 illuminated, the motor in 12 will be stopped. Similarly, as soon as the bend 5 is of normal length, photocell 18 not illuminated and photocell 22 illuminated, the motor in 13 is stopped. Said braking effects will avoid undue oscillations in the control of the bends.

When the braking of the motors in 12 and 13 is ensured by an electromagnetic operation, the same signals may be applied to the braking windings when the motors only rotate in a single direction. When the motors can rotate in both directions, said signals may also be used but an additional routing arrangement is necessary for determining the polarity of the current to be applied to the additional braking winding of the motor under the control of the direction of rotation of said motor. Otherwise said, the braking current must be of a defined polarity when, before the occurrence of the output signal $\overline{C}_1.C_2$ for the control of the motor in 12, or of the signal $\overline{C}_3.C_4$ for the control of the motor in 13, the signal which controlled the rotation of the motor was $C_1.C_2$ for 12 or $C_3.C_4$ for 13, respectively; and the braking current must be of the opposite polarity when before $\overline{C}_1.C_2$ or $\overline{C}_3.C_4$, respectively, the signal which controlled the rotation of the motor was $\overline{C}_1.\overline{C}_2$ for 12 or $\overline{C}_3.\overline{C}_4$ for 13. An illustrative embodiment of such a control is shown in FIG. 3 for the control member 12. The control arrangement for 13 will be similarly arranged.

Referring to FIG. 3, the AND-circuits 42 and 52 deliver respectively the signals $C_1.C_2$ and $\overline{C}_1.\overline{C}_2$. An additional AND-circuit forming the signal $\overline{C}_1.C_2$ is associated to said circuits 42 and 52. From the output of said circuit 43 are controlled two gates 44 and 45, the outputs of which respectively control two further gates 50 and 51 which receive input currents of respectively opposite polarities + and −, and have their outputs united together at 53 which may be understood as connected to the electromagnetic winding brake in the motor in 12. The output of 42 is connected to 14 as previously said and the output of 52 is connected to 34 as also said. However, temporary stores 46 and 47 are provided, store 46 for temporarily memorizing the activation of the output of 42 and store 47 for temporarily memorizing the activation of the output of 52. The gates 44 and 45 are respectively controlled from said stores 46 and 47. Store 46 is reset through the delay 48 when, after being activated from 42 and having then unblocked the gate 44, the signal from 43 passes through the gate 44 for activating the gate 50 and consequently sending a braking current on 53. Store 47 is reset through a delay 49 when after having been activated from 52 and having then unblocked the gate 45, the signal from 43 passing through said gate has unblocked gate 51 for routing a minus polarity voltage to 53. Each store may comprise a bistable member.

The operation of the circuits of FIG. 3 may be briefly stated as follows: considering that the output of 42 has just been activated for lengthening the bend 4, as the motor 12 is started, the activation of 46 memorizes said start in a determined direction of rotation. Gate 44 is unblocked by the activation of the store 46 but no higher level signal issues from 43, and consequently gate 50 remains blocked. When the bend is sufficiently lengthened for masking the photocell 17, the motor in 12 rotates according its own inertia, the output of 43 reaches its higher level and gate 44 transfers to gate 50 a voltage which unblocks said gate 50. The braking voltage is applied with its proper polarity to the motor. The resetting of the store 46 stops the application of the braking current to the motor by blocking the gate 44. The operation is quite similar when it is the circuit 52 which is activated, the store 47 and the gates 45 and 51 being then the concerned members in the circuit.

When the motors rotate in either direction but do not include any separate braking means, either electromechanical or electromagnetic, advantage may still be taken from such an arrangement as in FIG. 3; by omitting the gates 50 and 51, connecting the output of 44 to 34 and the output of 45 to 14. When the signal $C_1.C_2$ which drives the motor in one direction disappears, the motor is immediately submitted to a voltage from $\overline{C}_1.C_2$ tending to rotate the motor in the reverse direction, and consequently oppose to the inertia effect of the moving part 12—8. As the current from $\overline{C}_1.C_2$ is only temporary, since the store 46 is reset with a slight delay, this is a kind of self-braking action which impedes the development of oscillations as in the preceding case. Similarly, when it was the signal $\overline{C}_1.\overline{C}_2$ which was driving the motor 12, and ceases, as soon as the signal $\overline{C}_1.C_2$ appears a current tending to drive the motor in the reverse direction is applied from 45 to the lead 14, and this application of current will last only the delay determined by 49, after which the store 47 is reset.

When the motors are not rotatable in both directions and are not provided with braking means, advantage may still be taken of signals additional to the rotation controlling signals proper, as it will be illustratively explained with reference to FIG. 4. Motor 12 is still considered, the teaching being obvious for the control of motor 13, as previously said. In FIG. 4, the output of 28 is connected to the lead 14 through a gate 57 which is blocked when a further gate 54 delivers a higher level signal. The AND-signals $\overline{C}_1.C_2$ and $\overline{C}_1.\overline{C}_2$ are formed by the circuits 43 and 52. The output of 52 controls the activation of a temporary store 47, a bistable circuit for instance. The output from 43, delayed at 56 is applied to two gates 54 and 55 controlled from the store 47 in a reciprocal or complementary way. The output of 55 is connected to the lead 14 and, through a delay 49 to the resetting input of 47. Gate 54 is unblocked when 47 is at rest or reset, gate 55 is unblocked when 47 is at work, or activated from the signal $\overline{C}_1.\overline{C}_2$. The operation is as follows:

When the bend 4 is too short, amplifier 28 delivers the signal $C_2$ which, through 57 unblocked, activates the motor 12. The bend lengthens and the signal $\overline{C}_1.C_2$ comes to its higher level, is delayed at 56 and through 54 which is unblocked, blocks the gate 57 before the coming of $C_2$ to the lower value thereof. The lengthening of the bend has been thus anticipatedly limited, so that the bend will not pass too far the level of the photocell 21. Conversely, the bend shortening from the condition when $\overline{C}_1.\overline{C}_2$ is at the higher level thereof, store 47 being at work, as soon as the signal $\overline{C}_1.C_2$ comes to its higher level after the delay 56, said signal is applied to 14 through 55 which is then unblocked until the output of 55 with the delay imparted at 49 resets the store 47. The temporary activation of 14 temporarily drives the motor 12 for lengthening the bend and avoiding its ulterior shortening from inertia of the moving part of 12—8. Though not cancelling the fluctuations of length of the bend 4, such an arrangement substantially reduces them.

Other arrangements can be contemplated without departing of the spirit and scope of the invention, as such arrangements are derived from logical combinations of the "bits" of a four element code, $C_1$, $C_2$, $C_3$, $C_4$, and of course the complements thereof, $\overline{C}_1$, $\overline{C}_2$, $\overline{C}_3$ and $\overline{C}_4$ enables the required controls of the members 12 and 13. In such combinations, the upper photocells cannot be illuminated and the lower photocells simultaneously darkened, so that only nine terms are available for putting the invention into practice, viz.:

$$\overline{C}_1\ \overline{C}_2\ \overline{C}_3\ \overline{C}_4;\ \overline{C}_1\ \overline{C}_2\ \overline{C}_3\ \overline{C}_4;\ \overline{C}_1\ \overline{C}_2\ C_3\ C_4$$

$$\overline{C}_1\ C_2\ \overline{C}_3\ \overline{C}_4;\ \overline{C}_1\ C_2\ \overline{C}_3\ C_4;\ \overline{C}_1\ C_2\ C_3\ C_4$$

$$C_1\ C_2\ \overline{C}_3\ \overline{C}_4;\ C_1\ C_2\ \overline{C}_3\ C_4;\ C_1\ C_2\ C_3\ C_4$$

One may set such terms in a table and in additional columns mention the digits 1 and 0 for denoting the control voltages required on such control leads or connections as 14, 34, 15, 35, 53, . . . so that each definition of circuits forming a control signal by summing up and reducing to four digits the terms of the codes supplying the digits 1 (activation of controls) may be visualized.

What is claimed is:

1. In a tape reader wherein the tape forms two bends, an upstream one and a downstream one with respect to its drive over the read-out arrangement thereof, a control device comprising in combination: an input upstream bend roller; an output downstream bend roller; intermittently activable driving members for said rollers; length sensing means associated with said bends, each sensing means delivering a two-level voltage signal; a logical operating circuit connected to receive signals from said sensing means; and electrical connections from the said logical operating circuit to activate inputs of the said roller driving members.

2. A control device according to claim 1, wherein said sensing means is of the photoelectric type and wherein amplifiers are connected between said sensing means and said logical operating circuit.

3. A control device according to claim 2, wherein a pair of sensing means is associated to each of the tape bends, said sensing means being spaced apart at different heights with respect to said bend.

4. A control device as defined by claim 3 wherein said intermittently activable driving members are bidirectional and wherein said logical operating circuit is effective to cause forward or reverse movement of said driving members for damping oscillations of the lengths of said bends.

5. A control device as defined by claim 4 in which said logical operating circuit includes stores for memorizing the conditions of said sensing means for incorrect bend lengths and further including gating circuits connected to said stores for routing forward and reverse signals to said intermittently activable driving members.

6. A control device according to claim 1 in which said sensing means comprises two pairs of sensing devices, one pair associated with each bend and the devices of each pair being spaced apart from each other; and in which said logical circuit is operative to control the upstream or downstream bend from the signals from both pairs of said sensing devices.

References Cited in the file of this patent

UNITED STATES PATENTS

| | | |
|---|---|---|
| 2,877,012 | Angel et al. | Mar. 10, 1959 |
| 2,907,565 | Sauter | Oct. 6, 1959 |
| 2,921,753 | Lahti et al. | Jan. 19, 1960 |
| 2,952,415 | Gilson | Sept. 13, 1960 |
| 3,047,198 | Long | July 31, 1962 |
| 3,090,535 | Hurst et al. | May 21, 1963 |